Sept. 29, 1959    E. HOFFMEISTER    2,906,022
ARTICULATED SLIP-JOINT CONNECTION FOR
HIGH SPEED DENTAL MACHINES Filed May 24, 1955      2 Sheets-Sheet 1

2,906,022
ARTICULATED SLIP-JOINT CONNECTION FOR HIGH SPEED DENTAL MACHINES

Erich Hoffmeister, Biberach (Riss), Germany

Application May 24, 1955, Serial No. 510,684

Claims priority, application Germany June 5, 1954

3 Claims. (Cl. 32—26)

This invention relates to high-speed articulated slip joint connections for dental machines.

High-speed articulated slip joint connections are already known wherein a drive shaft mounted in a bearing sleeve and a cord pulley fixed to the said shaft are fixedly secured to the articulated slip joint connection. With these known devices it is relatively difficult to install the drive shaft with the bearing sleeve, owing to the fixed connection of the drive shaft and bearing sleeve with the slip joint connection. Furthermore, the cord pulleys carried by the drive shaft can only be interchanged by a person skilled in the art when it is necessary to employ different rotational speeds or to provide a replacement.

Therefore, according to the invention the bearing sleeve with the drive shaft and the cord pulley fixed to the drive shaft, is constructed as a unit adapted to be inserted into a socket in the slip joint connection and locked to said slip joint connection.

In order to lock the drive unit, consisting of a bearing sleeve, bearings, drive shaft and cord pulley, to the articulated slip joint connection, the bearing sleeve according to the invention is provided at its end adjacent the cord pulley with a threaded portion which can be screwed into a corresponding threaded portion in the socket of the slip joint connection, on which socket the articulation member is rotatable, and with a collar adapted to serve as a limiting abutment in the longitudinal direction for the slip joint connection. By virtue of the collar formed on the bearing sleeve it is no longer necessary to provide special limiting elements for the end play of the slip joint connection in the articulation member.

The bearings for the drive shaft, situated at the extreme forward and rear ends of the bearing sleeve may be constructed as self-aligning bearings with pressed-out nose pieces. The self-aligning bearings align themselves accurately in accordance with the shaft, thus preventing any canting and ensuring particularly smooth running of the shaft. The nose pieces of the self-aligning bearings serve also to protect the latter from distortion.

Figure 1:
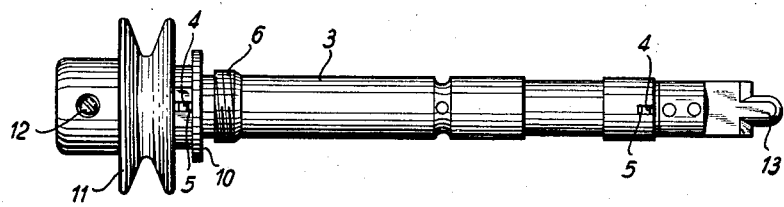
Figure 3:
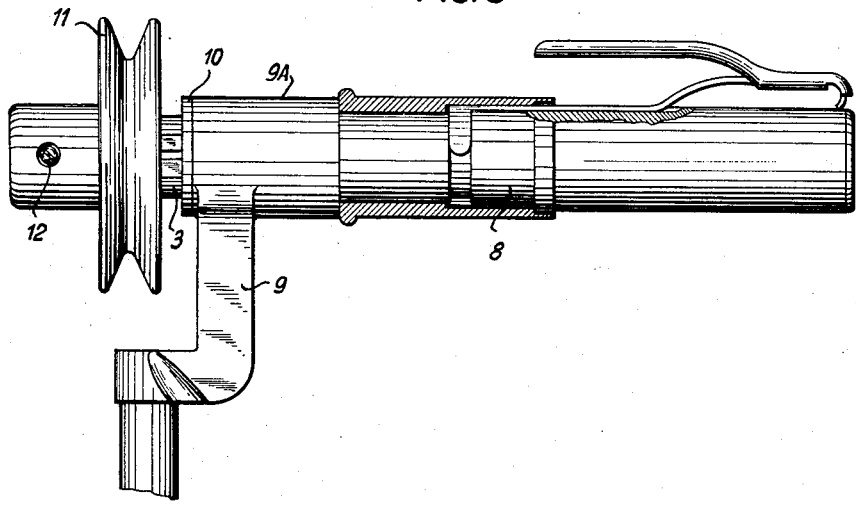
Figure 2:
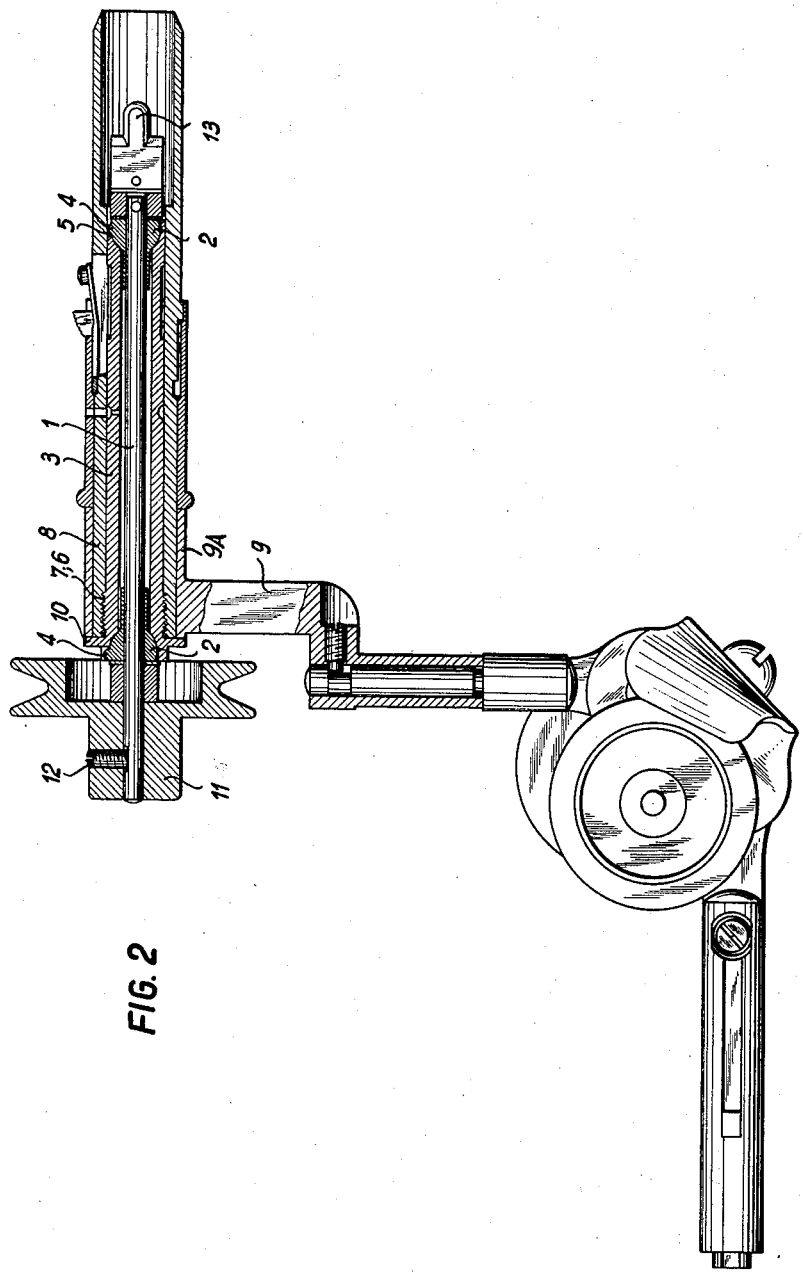

For a better understanding of the invention and to show how it may be carried into effect, a constructional embodiment thereof will now be described, by way of example, with reference to the accompanying drawings, in which:

Figure 1 is a side elevation of a drive unit consisting of a bearing sleeve with bearings, a drive shaft and a cord pulley, Figure 2 is an longitudinal sectional view of an articulated slip joint connection including a drive unit according to Figure 1 but fitted with a larger cord pulley, and Figure 3 is a fragmentary plan view, partly in section, corresponding to Figure 2.

As shown in Figures 1 and 2, the drive unit comprises a drive shaft 1 mounted in self-aligning bearings 2 which are arranged at the extreme front and rear ends of a bearing sleeve 3. The self-aligning bearings 2 have radially projecting nose pieces 4 which engage in holes 5 (Figure 1) in the bearing sleeve 3, so that the self-aligning bearings are protected from distortion.

In order to keep bearing friction to a minimum, the drive shaft 1 is constructed as thin as possible, for example 2.35 mm. in diameter. By this means, and owing to the provision of self-aligning bearings, substantially frictionless easy running of the shaft is achieved, so that the device can be operated at very high speeds.

The bearing sleeve 3 is formed at its rear end adjacent a cord pulley 11 with an externally threaded portion 6 adapted to be screwed into a corresponding internally threaded portion 7 in the socket 8 of a slip joint connection 9 rotatable on the socket 8. The rear end of the bearing sleeve 3, is also provided with a collar 10 located externally of the threaded portion 6 and adapted to serve as an abutment for the socket 8 of the slip joint connection 9 so as to limit, in the longitudinal direction, the movement of the housing 9A of the slip joint connection 9.

The drive shaft 1 is provided at its rear end outside the bearing sleeve 3, with the aforesaid cord pulley 11 keyed to the drive shaft 1 by means of a screw 12. As will be seen from Figures 1 and 2, cord pulleys of different sizes can be fitted, the size depending on the various rotational speeds required in each particular case.

Located at the front end of the driving shaft 1 is an entrainment element 13 for the driving shaft of the instrument.

I claim:

1. An articulated slip joint connection device for high speed dental machines comprising a socket and a drive unit detachably in said socket, said drive unit including a bearing sleeve detachable with said unit from said socket, a drive shaft rotatably supported by said bearing sleeve, a cord pulley mounted on said drive shaft, and means for locking said unit in said socket, said means comprising a threaded portion on said bearing sleeve, said socket including a threaded portion for engaging the first said threaded portion, said device further including a housing for the socket and a collar on said bearing sleeve forming a limiting abutment for the housing.

2. An articulated slip joint connection device as claimed in claim 1, wherein said means comprises, at the ends of said bearing sleeve, self-aligning bearings for said drive shaft, said bearings having nose pieces engageable in holes in said bearing sleeve for protecting said bearings from distortion.

3. For engagement in a socket of an articulated slip joint connection for dental machines, a detachable drive unit comprising a bearing sleeve, a drive shaft rotatably mounted in said bearing sleeve, and a cord pulley keyed to said drive shaft, the sleeve, shaft and pulley being detachable in unison from the socket, said bearing sleeve including, at one end adjacent the cord pulley, a threaded portion, said socket including a threaded portion engageable with the first said threaded portion, said unit further comprising a collar at said one end of said bearing sleeve for forming a limiting abutment for the slip joint connection, self-aligning bearings at the ends of said sleeve for supporting the drive shaft, said bearings including nose pieces engageable in holes in said sleeve for protecting said bearings from distortion.

References Cited in the file of this patent

UNITED STATES PATENTS 2,653,384    Shotton _____ Sept. 29, 1953

FOREIGN PATENTS 924,947    Germany _____ Mar. 10, 1955